United States Patent [19]

Preston

[11] 3,785,482

[45] Jan. 15, 1974

[54] MAGNETIC TAPE REEL SETUP

[76] Inventor: Larry T. Preston, 4023 Haverford Ave., Philadelphia, Pa. 19104

[22] Filed: Aug. 19, 1971

[21] Appl. No.: 173,140

Related U.S. Application Data

[63] Continuation-in-part of Ser. No. 792,297, Jan. 21, 1969, Pat. No. 3,601,336.

[52] U.S. Cl. .................... 206/53, 242/71.1, 242/74, 242/197

[51] Int. Cl. .................... B65d 85/676, G11b 23/10

[58] Field of Search .................... 242/197, 198, 199, 242/200, 71.1, 71.2, 74; 206/52 R, 52 F, 53; 352/72, 78

[56] References Cited

UNITED STATES PATENTS

| | | | |
|---|---|---|---|
| 3,159,357 | 12/1964 | Berlings | 242/71.1 |
| 3,512,734 | 5/1970 | Priest | 242/197 |
| 3,620,477 | 11/1971 | Penn | 242/197 |
| 1,686,204 | 10/1928 | Covert | 242/71.1 |
| 2,779,459 | 1/1957 | Waterman | 206/52 R X |
| 3,227,269 | 1/1966 | Martinez et al. | 206/52 F |
| 1,747,656 | 2/1930 | Ausloos et al. | 206/53 |
| 3,400,897 | 9/1968 | Guernet | 206/53 X |
| 3,601,336 | 8/1971 | Preston | 242/197 |
| 1,840,647 | 1/1932 | Wheatley | 206/52 F |

FOREIGN PATENTS OR APPLICATIONS

| | | | |
|---|---|---|---|
| 1,005,392 | 9/1965 | Great Britain | 242/71.1 |

*Primary Examiner*—George F. Mautz
*Attorney*—Joseph Gray Jackson et al.

[57] ABSTRACT

An annular teflon hub has annular grooves in surfaces toward its end in which are annular projections of a plastic reel enclosure which can remain stationary while the hub turns with computer tape on it.

Identificatory material is on the peripheral circular outside of the enclosure near an opening through which the computer tape coms into or out from the interior.

A special flexible cover which can be manipulated by the fingers against two projections and has grooved ends, which fit over the ends of the opening, covers this opening when the reel set-up is not in use, and holds the end of the tape at a point inside it convenient for the user.

5 Claims, 8 Drawing Figures

PATENTED JAN 15 1974 3,785,482

SHEET 1 OF 2

PATENTED JAN 15 1974 3,785,482

SHEET 2 OF 2

MAGNETIC TAPE REEL SETUP

This present application is a continuation-in-part of my copending application Ser. No. 792,297, filed Jan. 21, 1969, for Magnetic computer Tape Reel, now U.S. Pat. No. 3,601,336.

This invention relates to a magnetic tape reel set-up.

A purpose of the invention is to provide an improved form of magnetic tape reel set-up.

A further purpose of the invention is to provide an especially simple inexpensive yet effective form of magnetic computer tape reel in which a single set of identificatory matter in a single location is readily readable both in storage and in use.

A further purpose of the invention is to provide an improved form of magnetic tape reel setup in which the tape is completely enclosed without substantial opening when in storage, yet is readily openable for use, without opening the peripheral edge of the tape directly to the outside all around the circumference.

A further purpose is to provide a magnetic tape reel setup which is capable of being enclosed substantially completely to form a handily portable self-contained enclosed unit for transportation and storage, by means of a completely separable cover which is especially small, handy and simple to deal with and use, and inexpensive.

A further purpose is to provide a magnetic tape setup which after removal from storage can be especially quickly and easily set up appropriately to actually use the particular tape in an appropriate machine or the like, such as data processing equipment.

Further purposes and advantages will be apparent from the following description and claims.

In the drawings, I have chosen to illustrate my invention by particular embodiments chosen from the standpoints of convenience in illustration, satisfactory operation, and clear demonstration of the principles involved.

Figures 1, 2, 3:
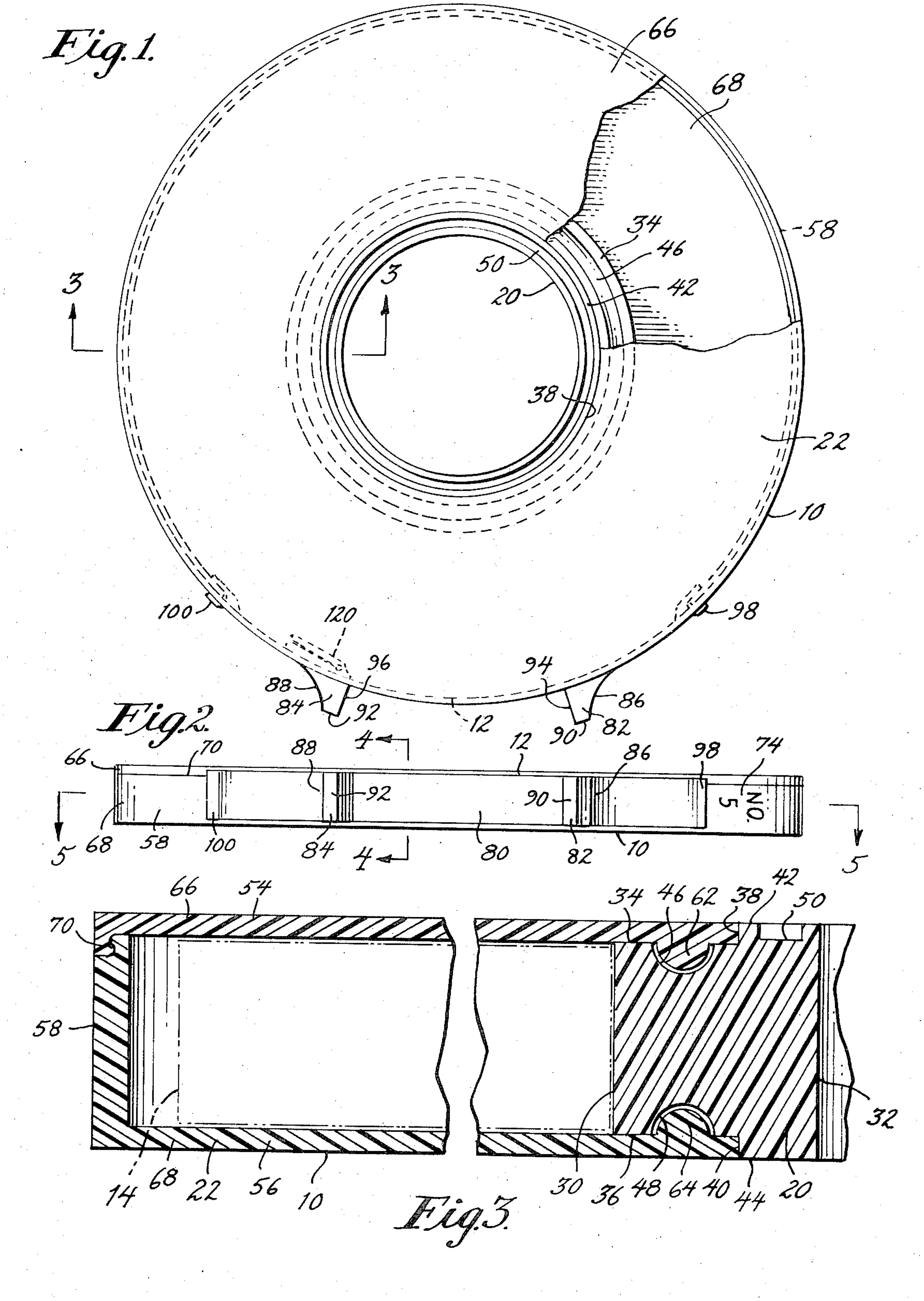
FIG. 1 is an elevational view, partly broken away, of a particular embodiment of my magnetic tape reel setup in condition for storage. It is taken from the side, along the axis of rotation of the reel, but with the reel positioned so that the cover is down rather than somewhere in an intermediate position between top and bottom as it normally would be in actual storage.
FIG. 2 is an elevational view of the same embodiment lying flat as it might if laid on a table, for example. It is taken looking at the outer edge of the reel and cover from a position on the side where the cover is.
FIG. 3 is an enlarged fragmentary sectional view along the line 3—3 on FIG. 1.

As will be evident, the magnetic computer tape reel setup shown in the drawings is made up of the reel 10 itself and cover 12, with of course magnetic tape 14, especially computer tape, shown for example in phantom in FIG. 3, being intended to be mounted on the reel.

More specifically, the reel is made up of hub member 20 and outer member 22, which also can be called the identificatory member, and the tape is mounted on the outside of the hub member.

Hub member 20 is essentially annular in form with cylindrical radially outside surface 30, and with cylindrical radially inside surface 32 adapted to be mounted on a reel motor hub (not shown) which forms part of a magnetic tape drive. The hub member has ends which are preferably in a stepped form, with flat radially outer end surfaces 34 and 36 going inward to cylindrical step surfaces 38 and 40 extending further out, from the axial standpoint, and flat radially inner end surfaces 42 and 44 beyond these steps, perpendicular to the hub axis.

Radially outer end surfaces 34 and 36 have annular grooves 46 and 48 respectively, semi-circular in cross section, and annular around the same hub axis that cylindrical surfaces 30, 32 and 38 and 40 are around. Write enable ring 50 is in surface 42, this ring likewise being annular around the same axis.

Outer member 22 is separate from the hub member and is able to remain stationary while the hub member turns freely. The outer member 22 has a loose fit or at any rate preferably at least a near positioning, at its inner end outside of cylindrical surfaces 38 and 40. In any case the relation between the outer member 22 and surfaces 38 and 40 on hub member 20 will be such as not to prevent completely free relative rotation between the outer member and the hub member.

Outer member 22 extends from its inner end near surfaces 38 and 40, along the outside with unbroken outer walls 54 and 56 extending radially outward, their outside surfaces being in the same planes as end surfaces 42 and 44 of the hub member, respectively. Outer member 22 also includes peripheral wall 58 cylindrical in shape around the periphery beyond the outside of the rolled up tape, but with opening 60 occupying a substantial portion of the periphery. More specifically, opening 60 preferably extends on the order of seven-fortieths of the circumference in a typical case as stated in my previously mentioned parent application. The idea is that the opening should extend far enough around so that the magnetic tape will be permitted to run in and out of the reel freely from or to a given point outside, both in unwound and fully wound condition of the tape inside, yet if the outside of the reel remains stationary in a proper position, the tape will not need to touch the outside of the reel. In width, opening 60 will extend the entire distance between side walls 54 and 56 of the outer member.

In the inner sides of outer wall portions 54 and 56 in each case there are annular projections 62 and 64 respectively, which interfit in grooves 46 and 48 respectively in the hub member, and together with the grooves form bearings for the relative motion as between hub and outer member. The outer member 22 in its actual construction is made up of two parts 66 and 68 which are held together by snap fit 70, and can of course be taken apart if desired, which when done will permit separation of outer member 22 from hub member 20. As indicated in my parent application, the outer member should be of a plastic material sufficiently rigid to hold its general shape without coming against the tape, while having sufficient flexibility for the snap-in feature.

Thus the identificatory matter can be read with ease when the device is in use with data processing equipment of the computer type since this outer surface will be stationary in a location in which the computer tape reel is on the face of the tape drive visible to anyone there and with the periphery of the reel being a part of what is visible. It will likewise be visible in storage, as will be seen.

Outside member 22 will preferably be transparent or at least sufficiently translucent to enable a user to tell approximately how high the build-up of tape on the outside of the reel is at any given time. Furthermore, as indicated in the parent application, it will preferably be of some color, such as red, blue or green.

Cover 12 has body member 80 in the form of a strip of a size adapted to substantially cover the opening 60, and on its outside are projections 82 and 84, at spaced positions preferably symmetrical about the center of the strip, and a distance apart which can be readily encompassed by the fingers of one hand of the user. The surfaces 86 and 88 which are on the faces of these projections away from each other are preferably somewhat concavely arcuate in shape and slightly roughened to afford an easy grip for the thumb and one or more of the fingers of the hand of the person using them. The rest of the projection can as shown be more or less cylindrically surfaced tops 90 and 92 and more or less radially surfaced near sides 94 and 96 respectively. Preferably where two sides come together, such as 92 and 96, or 92 and 88, the angle will be at least somewhat rounded off.

At the respective far ends of the strip 80 are end members 98 and 100 respectively, adapted to fit over the ends 102 and 104 of outer portion 58 of outside member 22. More specifically, the end members will preferably be, in their section longitudinally of the strip, in the form of a fork 106 with prongs 108 and 110 defining a groove 112 into which the end of the outside portion of the outside member fits. Prong 108 toward the outside is preferably shorter than prong 110 toward the inside.

Figure 5:
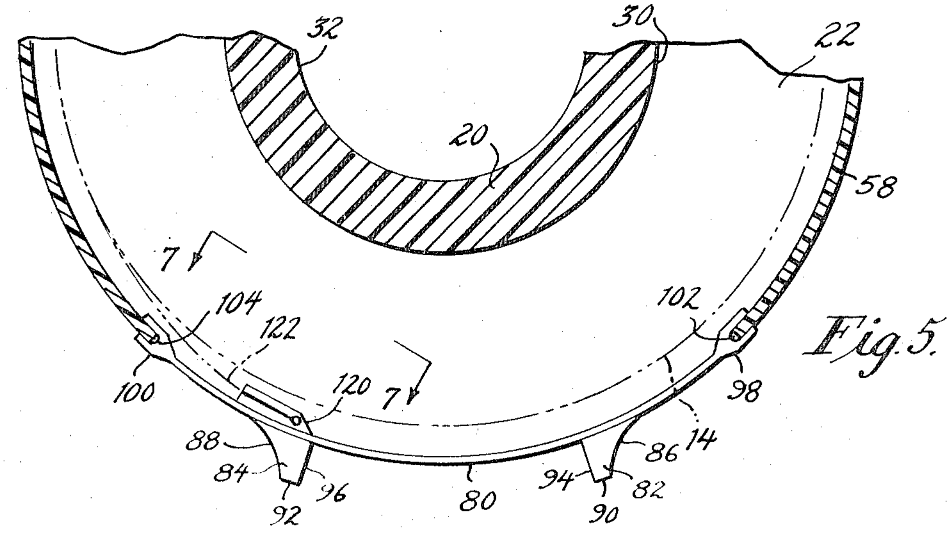
FIG. 5 is a fragmentary sectional view along the line 5—5 on FIG. 2, but showing the cover in elevation in place on the reel.
Figures 4, 6, 7, 8:
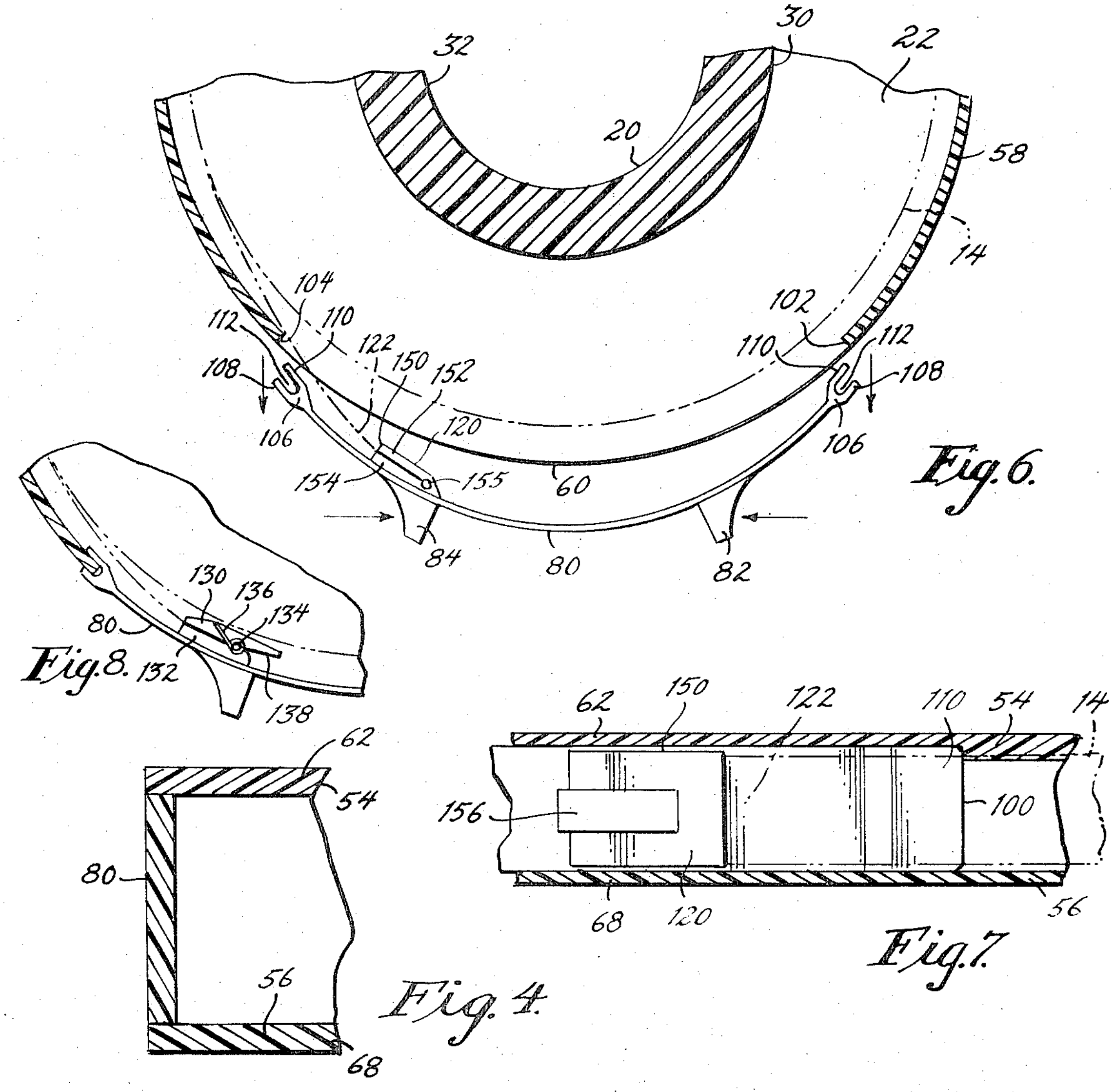
FIG. 4 is an enlarged fragmentary sectional view along the line 4—4 on FIG. 2.
FIG. 6 is the same as FIG. 5, but with the cover shown just after removal, to show the operation of the device in this connection.
FIG. 7 is an enlarged fragmentary sectional view along the line 7—7 on FIG. 5, but with the edge of the cover 14 which is shown as outermost in FIG. 5 being down rather than up in FIG. 7.
FIG. 8 is a view like FIG. 5 of a fragmentary part of what is shown in FIG. 5, but of a variation in respect to the particular holder for the tape end, which holder forms part of the cover.

Strip 80 is made of some material such as flexible plastic which has a spring-like character which will permit the fingers against the projections 82 and 84 to pull the two end members closer together, as shown at FIG. 6, and permit their insertion on the ends of the opening in the outer portion of outer member 22 as shown in FIG. 5.

On the inside of the cover, preferably at approximately the same location as one of the projections on the outside, is located fastener 120 which may take any suitable form to hold tape end 122.

For example, as shown in the alternate form in FIG. 8, fastener 120 may take the familiar form such as found in some clothespins in which two jaw members 130 and 132, the latter of which is fastened to the strip 80, extend back beyond pivot 134 which is surrounded by helical spring 136 biased to keep the jaw members together by spring action on the two jaw members to which the spring's respective straight ends, only one of which is visible, are respectively attached. There is an opening for admission of the tape between the ends of the jaw members, and their inner surfaces may be slightly roughened to facilitate holding the tape end.

Another type of fastener 150 is shown for example in FIGS. 6 and 7, in which plastic capable of holding its position after bending is utilized to make jaws 152 and 154. Pin 155 is toward the back end between the two jaws. Jaw 152 furthest away from body member 80 can be pressed down in the position shown in FIG. 6 to hold tape end 122, with center portion 156 serving a reinforcing function to help keep it there, by friction between its own sides and the sides of the two portions of jaw 152 next to that center portion 156, one on either side of it.

In operation, the present magnetic tape reel setup will be mounted on a reel motor hub, with the reel's own hub member and tape mounted on that hub member turning with the reel motor hub, and the tape extending out through the opening in use. The outside member 22 of the reel, or in other words the identificatory member, will remain stationary and the respective grooves and projections will be sliding in one another. Thus, we have an extremely simple construction in which the identification can be put on one place only if desired, and will be perfectly visible when the magnetic computer tape reel is in use on the face of the tape drive.

When the device is taken out of such use and desired to be stored, the cover 12 can be grasped and somewhat bent as illustrated in FIG. 6, by gripping with the thumb on the far surface of one projection and a finger on the far surface of the other and bringing the ends closer together, and the cover brought to a position where the grooves in the cover's end members, on slightly reducing the bending, will fit over the ends of the peripheral part of the reel next to the opening in that peripheral part.

Before this is done, the end of the rolled-up tape will have been put in fastener 120.

The tape setup can then be put in a suitable storage bin with the projection nearest the identificatory matter up against the edge of the place on which it will rest on the storage bin in front, and the identificatory matter readily visible to one going to the storage bin.

When the time comes to use it again, the projections can be grasped and the cover removed from the opening and the tape end will then be right at hand in the fastener without any fumbling around, in order to facilitate immediately setting the reel and tape up for use in the date processing equipment. The device is thus a very simple inexpensive one which will facilitate identification of the tape, storage of the device in secure and closed condition, and removal of the device from storage and setting it up for re-use.

In view of my invention and disclosure, variations and modifications to meet individual whim or particular need will doubtless become evident to others skilled in the art, to obtian all or part of the benefits of my invention without copying the apparatus shown, and I, therefore, claim all such insofar as they fall within the reasonable spirit and scope of my claims.

Having thus described my invention what I claim as new and desire to secure by Letters Patent is:

1. A magnetic computer tape reel setup for utilization in storage and use, comprising (1) a plastic hub member having an axis of revolution and having flat surfaces perpendicular to that axis, one toward each end of the hub, with each of the two mentioned surfaces having a groove annular about that axis, (2) an identificatory member which has a cylindrical outer edge with identificatory matter on it and an opening in it large enough for passage of magnetic computer tape and which identificatory member has two side members spaced sufficiently apart to permit tape to build up on the hub in between, which side members extend to a plastic annular projection in each side, each of which projections slidably interfits with a different one of the grooves, the identificatory member being removable from the hub, and (3) for storage a cover having an inner fastener to which the end of the tape is removably attached, which cover covers the opening during storage.

2. A setup of claim 1, in which the cover in effect constitutes a spring member whose spring action tends to bring its end portions further apart and there are two tongue-and-groove type interacting fastening means, each of which is on a different one of these end portions and the respective nearby portion of the identificatory member, for fastening the respective end portions and above nearby portions together, when the cover is in closure position.

3. A setup for magnetic computer tape comprising (1) a teflon annular hub member having an axis of rotation and adapted to be rotated by a tape drive, which hub member has flat surfaces perpendicular to the axis of the hub member, one toward each end of the hub, each of the two mentioned flat surfaces having a groove extending in a complete circle around the axis of the hub member as its center, which groove is semi-circular in cross-section, and said hub member having a radially outside surface cylindrical about the axis of the hub member as its center, which radially outside surface is adapted to have magnetic tape mounted reel-fashion upon it, (2) an identificatory member made of plastic and in outline cylindrical around the axis of the hub member which identificatory member has an outer edge portion with an opening in it for the tape to go in and out of in winding and unwinding in use respectively and identificatory matter on the outer edge portion near but not flush against the opening, and two side portions each extending unbrokenly from the outer edge portion at least to a circle which is just axially beyond the respective previously mentioned flat surfaces toward the end of the hub member and at least as far in from the radial standpoint as the previously mentioned groove, the side portions each having an annular axially inward projection semi-circular in cross-sectional outline slidably interfitting with the respective grooves in the adjacent surfaces of the hub member, the identificatory member being made up of two separable sub-members having means for being snap fit together in the outer edge portion of the identificatory member, which means for snap fitting holds them together in rotation and storage, the outer edge portion of the identificatory member ending in a single edge at each end of the opening and (3) a flexible cover portion included in the setup in storage and having a groove at each end respectively fitting over those edges, tape-end holding means on the inside of the cover portion holding the outer end of the tape, and two spaced projections on the outside of the cover portion, the cover portion having a spring-like tendency to straighten itself and thus keep the grooves in place on the single edges and being adapted by means of a user's fingers exerting inward force on the outside of the projections to have its curvature increased and its ends brought together to release it from its position over the opening.

4. A removable cover for placing over the outside of an opening which extends at least partway along one semi-circular distance of the circumferential edge of a magnetic tape reel, comprising (1) an impervious strip-form body member constituting an impervious shield member of a size to cover the opening and having ends longitudinally of the strip each having a mating surface and adapted to fit against respectively cooperating elements on the reel which have a mating surface circumferentially beyond the corresponding mating surface of the strip, the body member having a spring-like flexibility tending to push the above mating surfaces of the cover against the cooperating mating surfaces on the reel and cause cooperative interfastening of cover and reel and adapted to permit contraction of the body member sufficiently to enable release of the cover from its position over the opening, and (2) a self-contained holding means for the end of the tape, which self-contained holding means is mounted entirely on the body member in a position where any portions of the holding means which may contact the reel are entirely inside of the coverage of the impervious shield constituted by the body member, the body member and holding means being such that the cover is adapted to be lifted completely off the reel while retaining hold by the holding means on the end of the tape.

5. A magnetic tape reel setup comprising in combination (1) a magnetic tape reel having an inner part adapted to have a tape mounted upon it and an outer part adapted to remain stationary when the inner part turns, the outer part having an opening in its outside edge, and (2) a removable cover for that opening in the outside edge of the magnetic tape reel, including (a) a strip-form body member of a size to cover the opening and (b) on the inside of the cover a holding means for the end of the tape, there being intercooperating means including cooperating elements on the ends of the cover and beyond them on the reel to fit together near the ends of the opening, and the body member having a spring-like flexibility tending to push its ends against the cooperating elements on the reel and adapted to permit contraction of the body member to enable release of the cover from its position over the opening.

* * * * *